(12) United States Patent
Saraswat et al.

(10) Patent No.: US 10,599,808 B2
(45) Date of Patent: *Mar. 24, 2020

(54) METHOD AND SYSTEM FOR DETERMINING CIRCUIT FAILURE RATE

(71) Applicant: Oracle International Corporation, Redwood Shores, CA (US)

(72) Inventors: Govind Saraswat, Santa Clara, CA (US); Wai Chung William Au, San Jose, CA (US); Douglas Stanley, Placerville, CA (US); Anuj Trivedi, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,678

(22) Filed: May 6, 2019

(65) Prior Publication Data
US 2019/0258773 A1    Aug. 22, 2019

Related U.S. Application Data

(63) Continuation of application No. 14/951,181, filed on Nov. 24, 2015, now Pat. No. 10,282,507.

(51) Int. Cl.
*G06F 17/50* (2006.01)

(52) U.S. Cl.
CPC ...... *G06F 17/5081* (2013.01); *G06F 17/5009* (2013.01); *G06F 17/5036* (2013.01);
(Continued)

(58) Field of Classification Search
None
See application file for complete search history.

(56) References Cited

U.S. PATENT DOCUMENTS

| 5,407,653 A | 4/1995 | Piwnica-Worms |
| 6,249,898 B1 | 6/2001 | Koh et al. |

(Continued)

OTHER PUBLICATIONS

S.M. Alam et al., "Thermal Aware Cell-Based Full-Chip Electromigration Reliability Analysis," 2005 ACM, GLSVLSI'05 Apr. 17-19, 2005, pp. 26-31 (6 pages).

(Continued)

*Primary Examiner* — Leigh M Garbowski
(74) *Attorney, Agent, or Firm* — Ferguson Braswell Fraser Kubasta PC (57) ABSTRACT

A method involves determining failure in time rate for a circuit. The method may include obtaining circuit data regarding a circuit. The circuit may include a first wire segment and a second wire segment. The method may further include obtaining reliability data. The reliability data may describe a failure of the circuit over a pre-determined time period. The method may further include obtaining a thermal map. The method may further include determining a first failure rate for the first wire segment of the circuit. The first failure rate may be a probability that the first wire segment fails in a predetermined amount of time. The method may further include determining a second failure rate for the second wire segment of the circuit. The method may further include generating a model of the circuit. The model of the circuit may describe the first and the second failure rate of the circuit.

17 Claims, 7 Drawing Sheets

(52) U.S. Cl.
CPC ...... *G06F 17/5045* (2013.01); *G06F 17/5068* (2013.01); *G06F 2217/10* (2013.01); *G06F 2217/76* (2013.01); *G06F 2217/80* (2013.01)

(56) References Cited

U.S. PATENT DOCUMENTS

| | | | |
|---|---|---|---|
| 6,675,139 | B1 | 1/2004 | Jetton et al. |
| 6,857,113 | B2 | 2/2005 | Gentry et al. |
| 7,016,794 | B2 | 3/2006 | Schultz |
| 7,472,038 | B2 | 12/2008 | Bose et al. |
| 7,472,363 | B1 | 12/2008 | Chandra |
| 7,797,652 | B2 * | 9/2010 | Monkowski ........ G06F 17/5068 700/110 |
| 7,886,238 | B1 | 2/2011 | Sharma et al. |
| 8,060,851 | B2 * | 11/2011 | Dokken ........... G01R 31/31855 716/136 |
| 8,356,270 | B2 | 1/2013 | Burd et al. |
| 8,689,169 | B2 | 4/2014 | Fischer et al. |
| 8,726,201 | B2 | 5/2014 | Bickford et al. |
| 8,782,577 | B2 | 7/2014 | Fischer et al. |
| 9,064,087 | B2 | 6/2015 | Bickford et al. |
| 9,223,919 | B2 | 12/2015 | Yu et al. |
| 9,323,870 | B2 * | 4/2016 | Chandra ................. G06F 17/50 |
| 9,330,222 | B2 | 5/2016 | White et al. |
| 2003/0066036 | A1 | 4/2003 | Mau |
| 2012/0096424 | A1 | 4/2012 | Burd et al. |
| 2016/0116527 | A1 | 4/2016 | Jain |

OTHER PUBLICATIONS

R.L. de Orio et al., "Physically based models of electromigration: from Black's equation to modern TCAD models," Microelectronics Reliability 50, Mar. 20, 2010, pp. 775-789 (15 pages).

J. Kitchin, "Statistical Electromigration Budgeting for Reliable Design and Verification in a 300-MHz Microprocessor," 1995 Symposium on VLSI Circtuis Digest of Technical Papers, Jun. 8-10, 1995, pp. 115-116 (2 pages).

J. Kitchin, "Design for Reliability in the Alpha 21164 Microprocessor," 1996 IEEE 34th Annual Spring Reliability Symposium, Apr. 18, 1996 (5 pages).

C. Oh et al., "A Methodology for Chip-Level Electromigration Risk Assessment and Product Qualification," 2004 IEEE Computer Society, Mar. 22-24, 2004 (6 pages).

T. Sun et al., "A New Statistical Electromigration Analysis Methodology that Incorporates Across-Chip Temperature Variation," 3rd Asia Symposium on Quality Electronic Design, Jul. 19-20, 2011, pp. 115-118 (4 pages).

International Search Report and Written Opinion issued in PCT/US2016/058825, dated Feb. 1, 2017 (12 pages).

H. Ceric et al., "Electromigration in submicron interconnect features of integrated circuits", Materials Science and Engineering: R: Reports, vol. 71, Is. 5-6, pp. 53-86, Oct. 29, 2010 (34 pages).

B. Vasudevan et al., "Analysis and Test of Electromigration Failures in FPGAs", Proc. of 2010 IEEE Int'l Symposium on Circuits and Systems, pp. 3905-3908, May 30, 2010 (4 pages).

B. Li et al., "Statistical Evaluation of Electromigration Reliability at Chip Level", IEEE Trans. on Devices and Materials Reliability, vol. 11, No. 1, pp. 86-91, Mar. 1, 2011 (6 pages).

* cited by examiner

METHOD AND SYSTEM FOR DETERMINING CIRCUIT FAILURE RATE

CROSS-REFERENCE TO RELATED APPLICATION

The present application is a continuation application of and, thereby, claims benefit under 35 U.S.C. § 120 to U.S. application Ser. No. 14/951,181, entitled, "METHOD AND SYSTEM FOR DETERMINING CIRCUIT FAILURE RATE," filed on Nov. 24, 2015, having the same inventors, and incorporated herein by reference.

BACKGROUND

Electromigration (EM) is a physical phenomenon where metal atoms of circuit interconnects undergo migration in the direction of applied electrical field due to random bombardment of the conducting electrons. This migration results in depletion or accumulation of metal density. The chip interconnects are used for signal propagation, as well as voltage delivery. EM affects both of these functions by decreasing the conductivity of the interconnects. An increase in total wire length and current densities, while decreasing wire widths, may affect the guarantee of EM reliability. As a result, EM sign-off, or verification steps that the circuit may be required to pass during reliability testing before manufacture, may report IC prototypes that fail the verification steps due to the inability of present EM analysis methods to adequately guarantee EM reliability. This may result in an increase in the number of iterations during the IC design process. Therefore, there is a need for an accurate EM analysis which rejects the pessimism limiting present EM analysis, where the pessimism may stem from overestimation of failure rates, leading to an increased number of IC design iterations.

SUMMARY

In general, in one aspect, embodiments relate to a method for determining failure in time (FIT) rate for a circuit. The method includes obtaining circuit data regarding a circuit. The circuit includes a first wire segment and a second wire segment. The method further includes obtaining reliability data. The reliability data describes a failure of the circuit over a pre-determined time period. The method further includes obtaining a thermal map. The thermal map describes a plurality of temperatures of the circuit. The method further includes determining, using the circuit data, the reliability data, and the thermal map, a first failure rate for the first wire segment of the circuit. The first failure rate is a probability that the first wire segment of the circuit fails in a predetermined amount of time. The method further includes determining, using the circuit data, the reliability data, and the thermal map, a second failure rate for the second wire segment of the circuit. The method further includes generating a model of the circuit. The model of the circuit describes the first failure rate for the first wire segment of the circuit and the second failure rate for the second wire segment of the circuit.

In general, in one aspect, embodiments relate to a system for determining failure in time (FIT) rate for a circuit. The system includes a processor and a memory executable by the processor. The memory includes functionality for obtaining circuit data regarding a circuit. The circuit includes a first wire segment and a second wire segment. The memory further includes functionality for obtaining reliability data. The reliability data describes a failure of the circuit over a pre-determined time period. The memory further includes functionality for obtaining a thermal map. The thermal map describes a plurality of temperatures of the circuit. The memory further includes functionality for determining, using the circuit data, the reliability data, and the thermal map, a first failure rate for the first wire segment of the circuit. The first failure rate is a probability that the first wire segment of the circuit fails in a predetermined amount of time. The memory further includes functionality for determining, using the circuit data, the reliability data, and the thermal map, a second failure rate for the second wire segment of the circuit. The memory further includes functionality for generating a model of the circuit. The model of the circuit describes the first failure rate for the first wire segment of the circuit and the second failure rate for the second wire segment of the circuit.

In general, in one aspect, embodiments relate to a non-transitory computer readable medium (CRM) storing various instructions for determining failure in time (FIT) rate for a circuit. The instructions include functionality for obtaining circuit data regarding a circuit. The circuit includes a first wire segment and a second wire segment. The instructions further include functionality for obtaining reliability data. The reliability data describes a failure of the circuit over a pre-determined time period. The instructions further include functionality for obtaining a thermal map. The thermal map describes a plurality of temperatures of the circuit. The instructions further include functionality for determining, using the circuit data, the reliability data, and the thermal map, a first failure rate for the first wire segment of the circuit. The first failure rate is a probability that the first wire segment of the circuit fails in a predetermined amount of time. The instructions further include functionality for determining, using the circuit data, the reliability data, and the thermal map, a second failure rate for the second wire segment of the circuit. The instructions further include functionality for generating a model of the circuit. The model of the circuit describes the first failure rate for the first wire segment of the circuit and the second failure rate for the second wire segment of the circuit.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments of the invention include a method, a system, and a non-transitory computer readable medium for determining a failure-in-time (FIT) rate for a circuit. The circuit may be any form of hardware, circuitry, integrated circuit(s), and/or electrical network that allows for the interconnection of electrical components. In particular, one or more embodiments are directed to obtaining circuit data and reliability data regarding the circuit. Furthermore, one or more embodiments are directed to obtaining a thermal map including various temperatures of the circuit. Additionally, one or more embodiments are directed to determining the failure rate for one or more wire segments of the circuit. The failure rates may be determined by using the reliability data, circuit data, and the temperatures acquired from the thermal map. Furthermore, one or more embodiments are directed to generating a model of the circuit that describes the failure rates for various components of the circuit.

In general, electromigration (EM) is the movement of metal atoms of circuit wire segments in the direction of applied electrical field due to random bombardment of the conducting electrons. This migration results in depletion or accumulation of metal density, causing failure of the wire segment. For example, EM may result in increased resistance of the wire segments caused by an open circuit due to a void within the wire segment. Also, EM may result in a short circuit due to the bridging of adjacent wire segments. In one or more embodiments, mathematically, 1 failure in time (FIT) is equal to 1 failure in 1 billion device hours. Reliability testing of wire segments may include time to failure (TTF) testing under conditions of varying voltages, currents, current densities, and/or temperatures. Therefore, experimental data describing the TTF of wire segments due to EM may be acquired through reliability testing, and may be further applied with statistical analysis, as described below in Equations 1-19, to predict failure rates of components operated in normal conditions.

Figure 1:
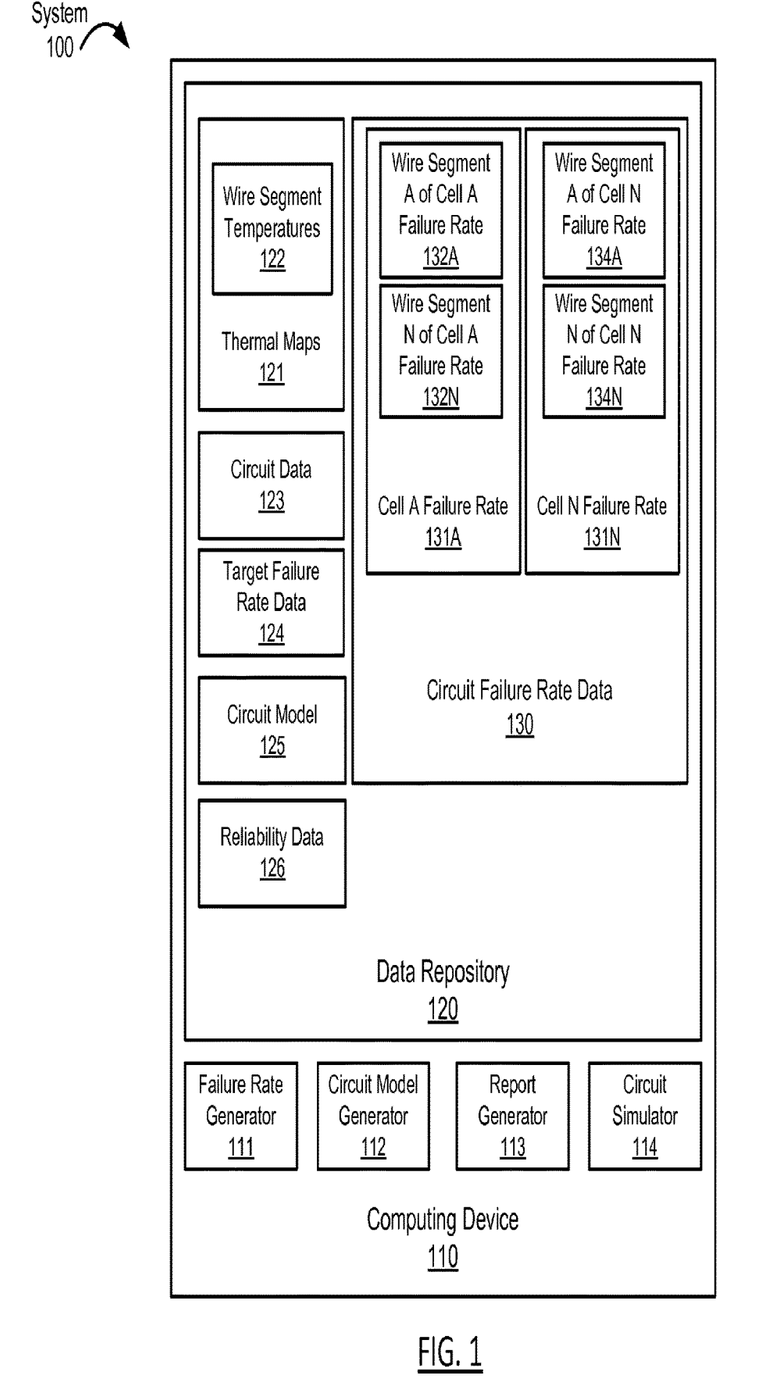
FIGS. 1, 2, and 3 show systems in accordance with one or more embodiments.

FIG. 1 shows a schematic diagram of a system in accordance with one or more embodiments of the invention. While FIG. 1 shows a configuration of components, other configurations may be used without departing from the scope of the invention. For example, various components may be combined to create a single component. As another example, the functionality performed by a single component may be performed by two or more components.

Turning to FIG. 1, in accordance with one or more embodiments of the invention, the system (100) may include one or more computing devices (110). In one or more embodiments, the computing device (110) includes various modules, such as a failure rate generator (111), a circuit model generator (112), a report generator (113), and a circuit simulator (114). The modules may be a combination of hardware and/or software within the computing device. Furthermore, the modules may not be distinct hardware and/or software, and various functionality performed by the computing device (110) may encompass one or more of the modules.

The computing device (110) may take the form of a specialized computer system. The computing device (110) may be implemented on the same or different specialized computer systems of the type found and described in relation to FIG. 7. In one or more embodiments, the computing device (110) may be a combination of hardware and software configured to display data using a display device (not shown). For example, the computing device (110) may be a mobile phone, a desktop computer, a laptop computer, a tablet computer, or any other device configured to operate as described herein.

The computing device (110) may store various data (e.g., thermal maps (121), circuit data (123), target failure rate data (124), circuit model (125), reliability data (126), circuit failure rate data (130)) in various data structures within a data repository (e.g., data repository (120)). In one or more embodiments of the invention, the data repository (120) is any type of storage unit and/or device (e.g., a file system, database, collection of tables, or any other storage mechanism) for storing data. Further, the data repository (120) may include multiple different storage units and/or devices. The multiple different storage units and/or devices may be of the same type or located at the same physical site.

In one or more embodiments, the circuit data (123) includes various data describing the circuit that are used when determining the failure rates for components of the circuit. For example, the circuit data may include the current densities for the wire segments of the circuit, the lengths for the wire segments of the circuit, the location and/or coordinates of components within the circuit, dimensions of the circuit, and/or the dimensions of components of the circuit.

In one or more embodiments, the reliability data (126) may include various parameters which are used below in Equations 1-19 in order to determine the failure rates for circuit components. For example, the reliability data (126) may include experimental data taken during reliability testing of circuit components and/or variables supplementary to the statistical analysis of circuit reliability engineering. In one or more embodiments, reliability data describes failure of one or more circuits over a pre-determined time period, such as TTF of a circuit and/or failure rates of components sampled from a population of circuit components. The pre-determined time period may be the planned lifetime of the circuit. In one or more embodiments, the pre-determined time period is the testing period during accelerated life testing of one or more circuits. In one or more embodiments, the pre-determined time period is the number of circuit operation hours under normal use conditions extrapolated from accelerated life testing. In one or more embodiments, the probability functions described by Equations 1-19 derive the dependence of average failure rate on the current density, temperature, and other various physical aspects of a wire segment.

In general, reliability engineering deals with managing the ability of a system or component to function properly within the target conditions over its planned lifetime. Reliability engineering may include analysis of reliability data (126) obtained during reliability testing of circuits in order to predict circuit component failure rates under normal use conditions. In one or more embodiments, the reliability data procured is not specific to one specific integrated circuit, but generic to any circuit. Therefore the reliability data may be used to extrapolate to specific requirements for any circuit. The experimental data used in reliability analysis may be obtained from various types of reliability testing, such as accelerated life testing. In general, accelerated life testing may be used to induce failure of test products at a higher rate by testing in harsher conditions, such as, but not limited to, combinations of high and low stress, strain, temperatures, voltage, current, vibration rate, and/or pressure regarding the test product, and/or environmental conditions during operation of the test product. In addition, certain test variables may be kept constant, while other test variables are varied, such as reliability testing with constant temperature and varying current densities. Further, accelerated life testing may include high temperature operating life (HTOL) testing, which may involve testing of circuits at elevated temperature and stress levels. As a consequence of accelerated life testing, the test product is expected to fail during testing as it would have failed during regular use, but in less time. For example, 100 hours at accelerated testing conditions may be equivalent to 10,000 hours at normal use conditions. Test products that undergo accelerated tests, as well as products that are used in normal conditions, may fail at variable times. Therefore, data including failure rates of components sampled from a population of circuit components may be obtained from accelerated life testing.

The reliability data (126) may include a Cumulative Distribution Function (CDF) of a random variable, such as time to failure, of one or more test circuits. In accordance with one or more embodiments, the CDF describes the probability that a real-valued random variable with a particular probability distribution will have a value less than or equal to any specified real value. In one or more embodiments, the probability that the unit will fail within time t is called the Cumulative Distribution Function (CDF), or Failure Function, and is denoted by F(t) in Equation 1 below:

$$F(t)=P(TTF<t).\qquad\text{Equation 1}$$

where F(t) represents the Failure Function, TTF represents the random variable time to failure (TTF), t represents a value of time, and P(TTF<t) represents the probability that the random variable TTF takes on a value less than time t. As described above, TTF may be acquired through empirical analysis, measurements taken during reliability testing, and/or predictions of failures over time of circuit components.

Further, reliability data (126) gathered from reliability testing, such as time to failure (TTF) of circuit components due to EM, may be obtained and extracted by the failure rate generator (111) and applied with statistical analysis in order to extrapolate and predict the failure rates of circuit components, as described herein by Equations 1-19. Here, the time to failure (TTF) is a random variable, and thus, TTF may take on several possible values. In this way, each particular value within a dataset of TTF may be linked with a probability of the random variable TTF taking on a particular value. In one or more embodiments, TTF is the random variable whose probability distribution provides for the reliability analysis and, thus, is used to determine failure rates for circuit components due to EM, such as the failure rates of wire segments (e.g., wire segment A for cell A failure rate (132A), wire segment N of cell A failure rate (132N), wire segment A for cell N failure rate (134A), wire segment N of cell N failure rate (134)). The reliability data (126) may include reliability measures as a probability distribution of cumulative failures and/or by time to failure (TTF).

In accordance with one or more embodiments, reliability data (126) includes the Reliability Function, which describes the probability of a unit operating for a specified amount of time without failure. As such, the reliability function may be a function of time, where every reliability value may have an associated time value. The Reliability Function (also known as the Survival Function) may describe the probability that the unit may be operational beyond time t, and may be denoted by R(t) in Equation 2 below:

$$R(t)=P(TTF>t)=1-F(t).\qquad\text{Equation 2}$$

where R(t) represents the Reliability Function, TTF represents the random variable time to failure (TTF), t represents a value of time, and P(TTF>t) represents the probability that the random variable TTF takes on a value greater than time t.

In one or more embodiments, a probability density function (PDF) is a function that describes the likelihood for a random variable to take on a given value. The probability of a random variable, such as TTF, falling within a particular range of values may be given by the integral of the random variable's probability density over the particular range. In other words, the probability of a random variable falling within a particular range of values may be given by the area under the probability density function. In one or more embodiments, the probability density function is nonnegative everywhere, and the integral of the PDF over the entire space is equal to one. Also, the PDF may be defined as the derivative of the CDF with respect to time t. Therefore, in accordance with one or more embodiments, the reliability data (126) includes the PDF, or f(t), and is expressed as Equation 3 below:

$$f(t) = \frac{dF(t)}{dt}\qquad\text{Equation 3}$$

where f(t) represents the Probability Density Function (PDF), and dF(t)/dt represents the derivative of the Failure Function F(t) with respect to time t.

Further, in one or more embodiments, integration of the PDF, or f(x), from zero to time t gives the Failure Function, or F(t), which is expressed as Equation 4 below:

$$F(t)=\int_0^t f(x)dx\qquad\text{Equation 4}$$

where f(x) represents the PDF, and F(t) represents the Failure Function.

In one or more embodiments, the failure rate generator (111) determines the failure rates of the circuit (e.g., circuit failure rate data (130), cell A failure rate (131A), cell N failure rate (131N), wire segment A for cell A failure rate (132A), wire segment N of cell A failure rate (132N), wire segment A for cell N failure rate (134A), wire segment N of cell N failure rate (134N)). For example, the failure rate generator (111) of the computing device (110) may obtain the various data required for the determination of the circuit failure rate data (130), such as circuit data (123), reliability data (126), and/or thermal maps (121). Additionally, the failure rate generator (111) may analyze the circuit failure rate data (130) and the target failure rate data (124) in order to determine information regarding pass/fail criteria of the circuit.

Furthermore, the failure rate may be defined as the rate of change in failure probability over the survival probability at time t. Also, the failure rate may be defined as the probability density function (PDF) over the probability that the unit may survive beyond time t, or the Reliability Function R(t). In one or more embodiments, the failure rate, denoted as λ(t), is used to determine the failure rate for components of the circuit. Therefore, in accordance with one or more embodiments, the failure rate generator (111) determines the failure rate, or λ(t), as expressed by Equation 5 below:

$$\lambda(t) = \frac{\frac{dF(t)}{dt}}{R(t)} = \frac{f(t)}{R(t)} \qquad \text{Equation 5}$$

λ(t) represents the failure rate of the wire segment, dF(t)/dt represents the derivative of the Failure Function F(t) with respect to time t, and R(t) represents the Reliability Function. Also, f(t) represents the PDF. In one or more embodiments, assuming that failure has not occurred at time t, λ(t) is a conditional probability of the PDF, or f(t). In one or more embodiments, the failure rate λ(t) describes the probability of observing a wire segment failure, given that the wire segment has lasted to time t.

In one or more embodiments, the target failure rate data (124) includes a failure rate for a circuit in accordance with a desired lifetime for the circuit and/or a component of the circuit. For example, the target failure rate may be a benchmark used to compare failure rates for a circuit design, and thus may be used to verify that a particular circuit design is ready for manufacture. In one or more embodiments, the target failure rate that is designated within the target failure rate data (124) is any value set by a user or set automatically by the computing device (110). In one or more embodiments, the failure rate generator (111) determines whether the circuit failure rate is less than or equal to the target failure rate, which results in a passing result for the circuit. Conversely, in accordance with one or more embodiments, the failure rate generator (111) determines whether the circuit failure rate is greater than the target failure rate, which results in a failing result for the circuit.

In one or more embodiments, the circuit failure rate data (130) includes data that describes the failure rate of a circuit as determined by the failure rate generator (111). Specifically, the circuit failure rate data (130) may include the failure rates for components of the circuit (e.g., cell A failure rate (131A), cell N failure rate (131N), wire segment A for cell A failure rate (132A), wire segment N of cell A failure rate (132N), wire segment A for cell N failure rate (134A), wire segment N of cell N failure rate (134N)). As such, the failure rates for components of the circuit (e.g., cell A failure rate (131A), cell N failure rate (131N), wire segment A for cell A failure rate (132A), wire segment N of cell A failure rate (132N), wire segment A for cell N failure rate (134A), wire segment N of cell N failure rate (134N)) may be used to determine the overall circuit failure rate data (130).

In one or more embodiments, the circuit failure rate data (130) includes the Average Failure Rate of one or more circuit components, which is the average frequency with which a unit fails, and is expressed in failures per unit of time. Furthermore, the failure rate generator (111) may determine the Average Failure Rate (AFR), which may be defined as the integration of the failure rate λ(t) over an interval of time and divided by time t, where the interval of time is from time zero to time t. In one or more embodiments, the Average Failure Rate (AFR), or AFR(t), is expressed as Equation 6 below:

$$AFR(t) = \frac{1}{t} \int_0^t \lambda(t) dt \qquad \text{Equation 6}$$

where AFR(t) represents the Average Failure Rate (AFR), λ(t) represents the failure rate, and t represents a value of time.

In one or more embodiments, through manipulation of notation, the AFR described by Equation 6 is represented with λ only. In one or more embodiments, assuming that failure has not occurred at time t equal to zero, λ may be determined by the failure rate generator (111) as a function of the failure probability for any time t. In one or more embodiments, the failure rate of a wire segment, or λ, at time t, is found by using Equations 5 and 6 and, is expressed as Equation 7 below:

$$\lambda = \frac{-\ln(1 - F(t))}{t} \qquad \text{Equation 7}$$

where λ represents the failure rate of the wire segment at time t, F(t) represents the Failure Function, and t represents a value of time.

In addition, in accordance with one or more embodiments the Failure Function, or F(t), is also expressed as Equation 8 below:

$$F(t) = 1 - e^{-\lambda t} \qquad \text{Equation 8}$$

where F(t) represents the Failure Function, λ represents the failure rate of the wire segment, and t represents a value of time.

In accordance with one or more embodiments, the circuit failure rate data (130) includes the circuit failure rate, which is the sum of the failure rates of wire segments, given that the wires may fail independently, and is expressed below as Equation 9. Further, Equation 9 relies on the condition that if one wire segment fails, then the whole circuit may fail. As such, in one or more embodiments, by using reliability data (126) attained through reliability analysis and circuit data (123), the failure rate generator (111) determines the failure rate due to EM for each wire segment, and subsequently adds the failure rates together, as described below by Equation 9, to determine the circuit failure rate. In this way, the circuit failure rate stored as circuit failure rate data (130) may be determined for the circuit.

$$\lambda_{chip} = \Sigma \lambda_{wire} \qquad \text{Equation 9}$$

where $\lambda_{chip}$ represents the failure rate for the circuit, and $\lambda_{wire}$ represents the wire segment failure rate.

In one or more embodiments, the circuit model (125) describes a two-dimensional, three-dimensional, and/or cross-sectional perspective of a circuit. The circuit model (125) may illustrate data that describes the circuit failure rate data (130) and/or the failure rates for components of the circuit (e.g., cell A failure rate (131A), cell N failure rate (131N), wire segment A for cell A failure rate (132A), wire segment N of cell A failure rate (132N), wire segment A for cell N failure rate (134A), wire segment N of cell N failure rate (134N)). In one or more embodiments, the circuit model (125) includes the effects of temperature data with respect to reliability data (126) on average failure rates, and thus, does not include a thermal map.

In one or more embodiments, the circuit model generator (112) simulates the circuit using the circuit simulator (114) and produces an output that represents circuit operation using data such as the current density in circuit data (123), the temperatures of circuit components obtained from thermal maps (121), and failure rates of circuit components obtained from circuit failure rate data (130). As such, in order to generate the circuit model, the circuit model generator (112) may obtain and extract data such as the circuit failure rate data (130), thermal maps (121), reliability data (126), and/or circuit data (123) for use in generating the circuit model.

In one or more embodiments, the thermal maps (121) include temperature data regarding various components of the circuit. The thermal maps (121) of a circuit may be a two-dimensional, three-dimensional, and/or cross-sectional model of the circuit which describe the average temperatures and/or range of temperatures of various sections and/or components of the circuit. Accordingly, the thermal maps may include various temperature values for wire segments of a circuit (e.g., wire segment temperatures (122)).

Further, circuit temperatures obtained from thermal maps (121) may be used to determine the median time to failure ($T_{50}$) due to EM. The median time to failure ($T_{50}$) due to EM may be calculated using an acceleration model, where an acceleration model may predict time-to-failure as a function of accelerated life testing. For example, Black's Equation, which is an acceleration model, may be used during accelerated life testing to determine the mean time to failure ($T_{50}$) due to EM. In one or more embodiments, Black's Equation extrapolates experimental data of components taken during reliability testing to predict component failure rates under normal operating conditions. This experimental data may be taken, for example, at elevated temperature and stress levels over various periods of time by running high temperature operating life (HTOL) testing, and stored as reliability data (126). Also, a mean time to failure ($T_{50}$) due to EM may be used to determine a desired operating temperature ($T_m$) for circuit components. In one or more embodiments, Black's Equation is expressed as Equation 10 below:

$$T_{50} = A e^{\frac{E_a}{k_B T_m}} j^{-n} \qquad \text{Equation 10}$$

where A represents Black's coefficient, $E_a$ represents the activation energy, $k_B$ represents the Boltzmann's coefficient, $T_m$ represents the absolute temperature in K, j represents the current density, and n represents a process parameter. As shown above in Equation 10, the temperature ($T_m$) of the wire segment appears in the exponent, and may therefore suggest that the temperature strongly affects the median ($T_{50}$) of the random variable TTF.

In one or more embodiments, the report generator (113) produces one or more reports which describe information regarding the circuit. For example, the report generator (113) may obtain and extract data regarding the circuit that may be included within a report, such as the circuit model (125) produced by the circuit model generator (112). Further, the report generator (113) may obtain data analyzed by the failure rate generator (111), such as the circuit failure rate data (130) and the target failure rate data (124), in order to determine information regarding pass/fail criteria of the circuit.

In general, EM reliability, or wire segment failure due to EM, may be described using a log-normal distribution of the Probability Density Function (PDF), or f(t). Therefore, in accordance with one or more embodiments, log-normal distribution of the PDF, or $f(t)_{log-normal}$, is expressed by Equation 11 below:

$$f(t)_{log-normal} = \frac{e^{\frac{-(ln(t)-ln(T_{50}))^2}{2\sigma^2}}}{t\sqrt{2\pi\sigma^2}} \qquad \text{Equation 11}$$

where $f(t)_{log-normal}$ represents the log-normal distribution of the PDF, t represents the random variable TTF, $T_{50}$ represents the median of the random variable TTF, and σ represents the standard deviation of the random variable TTF from $T_{50}$. In one or more embodiments, the standard deviation (σ) is provided by a foundry. In one or more embodiments, for the above mentioned EM model, for a certain range of standard deviation (σ) values, the failure rate is constant for a certain range of failure time values.

A log-normal distribution may be a probability distribution of a random variable whose logarithm is normally distributed. For example, if a random variable X is log-normally distributed, then Y=ln(X) may correspond to a normal distribution. Further to the aforementioned example, if Y has a normal distribution, then $X=e_Y$ may have a log-normal distribution. For simplicity, log-normal distribution of the PDF, or $f(t)_{log-normal}$, may be transformed to a standard normal, or Z, distribution by taking the natural log of $f(t)_{log-normal}$. Therefore, in accordance with one or more embodiments, the log-normal distribution of the PDF is expressed as a standard normal (or Z) distribution as described by Equation 12 below:

$$Z(x) = \frac{\ln(x) - \ln(T_{50})}{\sigma} \qquad \text{Equation 12}$$

where Z(x) represents the PDF as a standard normal, or Z, distribution, x represents the random variable TTF, $T_{50}$ represents the median of the random variable TTF, and σ represents the standard deviation of the random variable TTF from $T_{50}$.

Furthermore, in accordance with one or more embodiments, the Failure Function, or F(t), is expressed in terms of z as described by Equation 13 below:

$$F(t) = \Phi(Z(t)) = \frac{1}{\sqrt{2\pi}} \int_{-\infty}^{Z(t)} e^{-\frac{z^2}{2}} dz. \qquad \text{Equation 13}$$

where F(t) represents the Failure Function, Φ(Z(t)) represents the Failure Function expressed as a standard normal, or Z, distribution, and z represents the random variable TTF.

In one or more embodiments, by combining Equations 8, 10, 12, and 13, a relation may be obtained between the Failure Function, or F(t), and the current density, or j, and is expressed as Equation 14 below:

$$F(t) = \frac{1}{\sqrt{2\pi}} \int_{-\infty}^{\frac{\ln\left(\frac{tj^n}{A}\right)-\theta}{\sigma}} e^{-\frac{z^2}{2}} dz \qquad \text{Equation 14}$$

$$\int_{-\infty}^{\frac{\ln\left(\frac{tj^n}{A}\right)-\theta}{\sigma}} e^{-\frac{z^2}{2}} dz = \sqrt{2z}\,(1 - e^{-\lambda t}) \qquad \text{Equation 15}$$

$$\int_{-\infty}^{\frac{\ln(\alpha j^n - \theta)}{\sigma}} e^{-\frac{z^2}{2}} dz = \sqrt{2\pi}\,(1 - e^{-\lambda \tau}) \qquad \text{Equation 16}$$

$$\Phi\left(\frac{\ln(\alpha j^n - \theta)}{\sigma}\right) = 1 - e^{-\lambda \tau} \qquad \text{Equation 17}$$

$$\theta = \frac{E_a}{k_B T_m}.$$ Equation 18

$$\alpha = \frac{\tau}{A}$$ Equation 19 where F(t) represents the Failure Function at time t, A represents Black's coefficient, $E_a$ represents the activation energy, $k_B$ represents the Boltzmann's coefficient, $T_m$ represents the absolute temperature in K, j represents the current density, n represents a process parameter, z represents the random variable TTF, τ represents a desired lifetime of a wire segment, λ represents the failure rate of the wire segment, σ represents the standard deviation, and t represents a value of time.

In one or more embodiments, as mentioned above regarding Equation 7, the failure rate λ of a wire is shown to be related to the Failure function F(t). Therefore, in accordance with one or more embodiments, the relation between the failure rate due to EM, or λ, at time t and the EM current density, or j, of a wire segment is expressed as Equation 15 above. In accordance with one or more embodiments, Equation 16 above is another form of Equation 15 substituted with the variable α, where α is described by Equation 19.

In one or more embodiments, EM design goals are established in order to maintain an average product failure rate below a target failure rate over the planned lifetime of the chip. Therefore, the desired lifetime, or τ, may be used, as described above in Equation 15 and Equation 16, to determine a target failure rate stored as target failure rate data (124).

In one or more embodiments, Equation 16 is further simplified by using the failure function Φ of a standard normal distribution to express the EM reliability equation. Also, Φ values may be determined using various look-up tables. In particular, look-up tables may show the values of the cumulative distribution functions, probability functions, or probability density functions of certain common distributions for different values of their parameters, and may be used to determine whether or not a particular statistical result exceeds a specified threshold level. For example, a look-up table may be arranged in a multi-dimensional format where input parameters, i.e., with respect to Equations 14-19 identify a corresponding Φ value within the look-up table.

In addition, the EM reliability equation is the relation between the EM current density of a wire with its failure rate. Therefore, the failure rate generator (111) may determine) λ, or failure rate of a wire segment, from the EM reliability equation described above by Equation 17. The various parameters stored in reliability data (123), which are used in Equations 1-19 to calculate the failure rate for each wire segment, may be obtained through theoretical analysis and/or measurements taken during reliability testing of a tangible circuit, or from a virtual circuit generated by the circuit simulator of the computing device. For practical application, a foundry may provide the various parameters which are used to calculate the failure rate for each wire segment.

Figure 2:
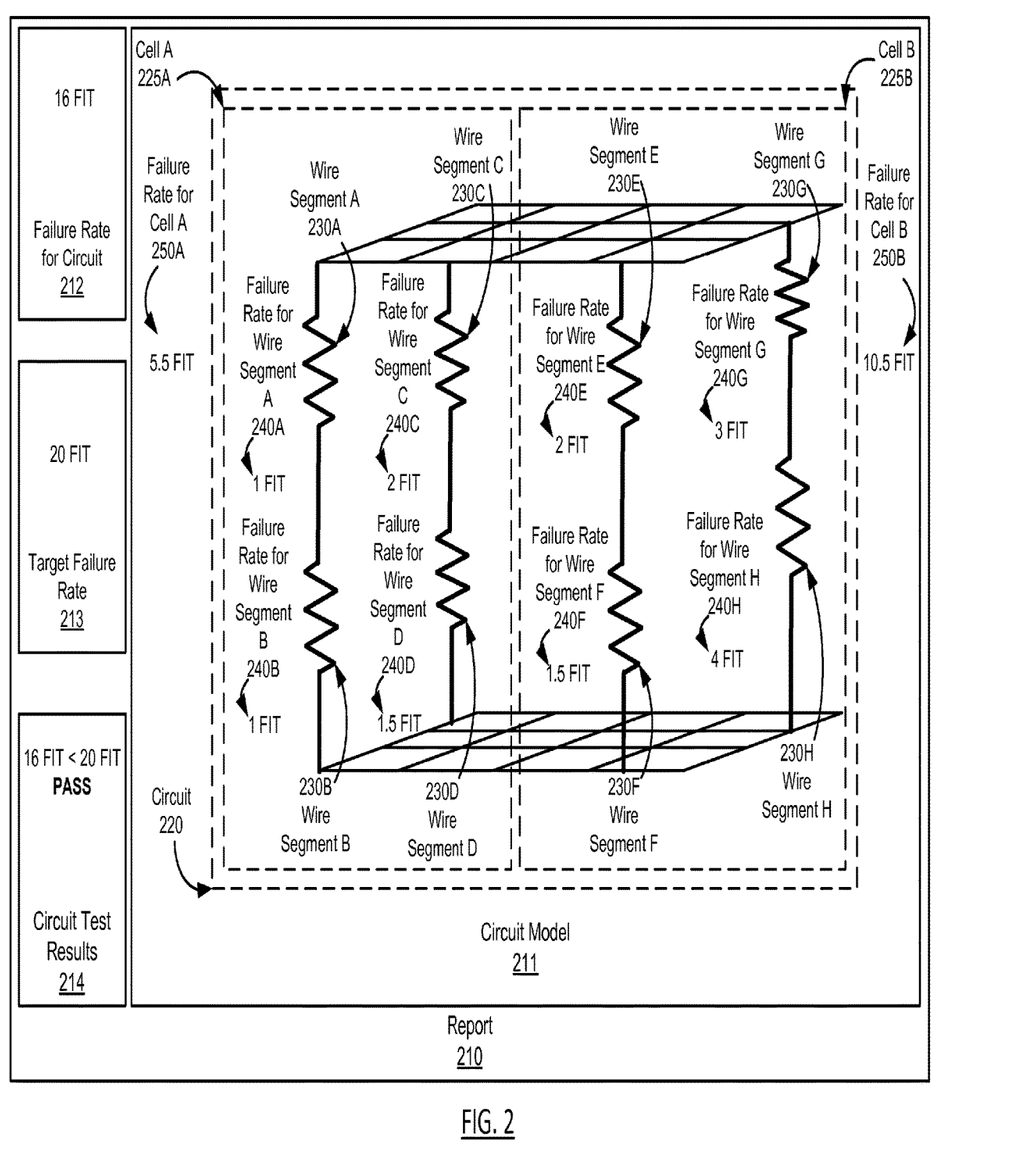

FIG. 2 shows a report regarding a circuit in accordance with one or more embodiments of the invention. As shown in FIG. 2, a report (210) describes a circuit model (211) that may be generated by the circuit model generator (112) of the computing device (110). Further, the report (210) describes a circuit model (211) regarding a circuit (220). The circuit (220) includes wire segments (e.g., wire segment A (230A), wire segment B (230B), wire segment C (230C), wire segment D (230D), wire segment E (230E), wire segment F (230F), wire segment G (230G), wire segment H (230H)) and cells (e.g., cell A (225A), cell B (225B)).

In accordance with one or more embodiments, the report (210) of FIG. 2 describes the failure rates of the circuit (220) generated by the failure rate generator (111) of the computing device (110). The report (210) may illustrate the failure rate for each wire segment (e.g., failure rate for wire segment A (240A), failure rate for wire segment B (240B), failure rate for wire segment C (240C), failure rate for wire segment D (240D), failure rate for wire segment E (240E), failure rate for wire segment F (240F), failure rate for wire segment G (240G), failure rate for wire segment H (240H)) for the circuit (220). The report further illustrates the failure rate for each cell (e.g., failure rate for cell A (250A), failure rate for cell B (250B)), the target failure rate (213) for the circuit (220), and the circuit test results (214) for the circuit (220).

In accordance with one or more embodiments, the failure rate for cell A (250A) is the sum of the failure rates for the wire segments (e.g., failure rate for wire segment A (240A), failure rate for wire segment B (240B), failure rate for wire segment C (240C), failure rate for wire segment D (240D)) within cell A (225A). Similarly, the failure rate for cell B (250B) is the sum of the failure rates for the wire segments (e.g., failure rate for wire segment E (240E), failure rate for wire segment F (240F), failure rate for wire segment G (240G), failure rate for wire segment H (240H)) within cell B (225B). Finally, as described by Equation 17 above, the failure rate for the circuit (212) is the sum of the failure rates of the cells (e.g., failure rate for cell A (250A), failure rate for cell B (250B)).

Keeping with FIG. 2, the report (210) further describes the circuit test results (214) for the circuit (220). The failure rate generator (111) uses a processor of the computing device (110) to compare the failure rate for the circuit (212) with the target failure rate (213) of the circuit in order to determine the circuit test results (214) for the report (210). For example, as shown in FIG. 2, the circuit failure rate (212) is less than the target failure rate (213), and therefore, the circuit test results (214) of the report (210) describes a passing result for the circuit (220).

Figure 3:
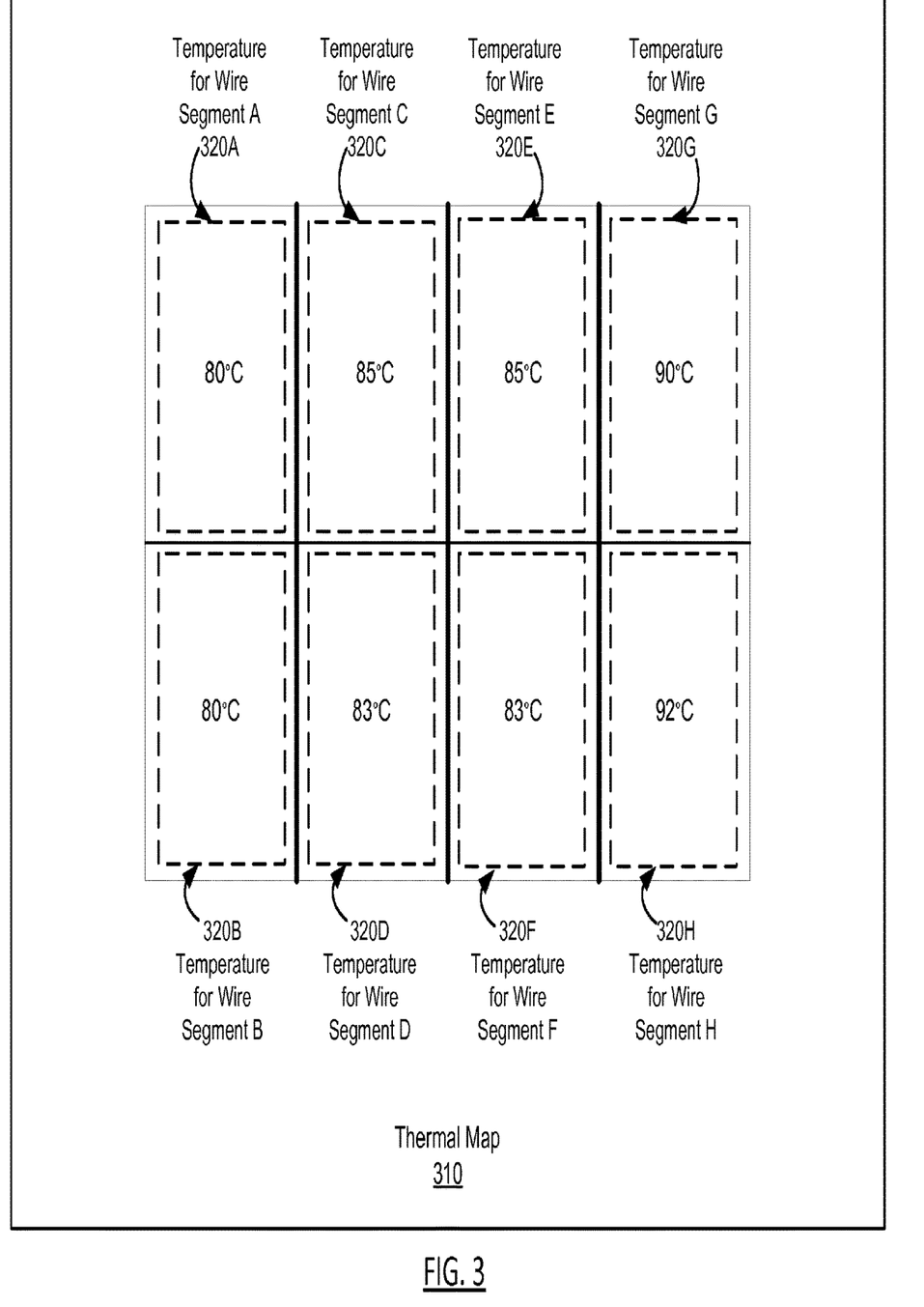

Turning to FIG. 3, an illustration of a thermal map that may be generated and/or obtained by a processor of the computing device is described. In accordance with one or more embodiments, FIG. 3 shows a thermal map (310) for the circuit (220) introduced in FIG. 2. The thermal map (310) illustrates various circuit temperatures (e.g., temperature for wire segment A (320A), temperature for wire segment B (320B), temperature for wire segment C (320C), temperature for wire segment D (320D), temperature for wire segment E (320E), temperature for wire segment F (320F), temperature for wire segment G (320G), temperature for wire segment H (320H)) for the wire segments of the circuit (220). In one or more embodiments, the EM reliability equation described by Equation 16 above is used to determine circuit temperatures (e.g., temperature for wire segment A-H (320A -320H)) used within a thermal map (e.g., thermal map (310)) of a circuit.

In one or more embodiments, the thermal map (310) may include circuit temperatures for the various wire segments of the circuit. In general, the thermal map, and the temperatures of various components of the circuit acquired from the thermal map, provide integrated circuit (IC) designers with data regarding how each component of the circuit is operating. For example, certain components may fluctuate between states of operation and nonoperation more frequently than others, and therefore, designers may be able to determine which components exhibit higher and/or lower temperatures during operation of the IC. As a result, the thermal maps provide IC designers with circuit temperature data that may allow for prediction regarding which components of the IC have a higher probability of failure. As such, wire segment temperatures acquired from thermal maps may be used when quantifying the failure rates for the wire segments, as well as the overall circuit failure rate.

Figure 4:
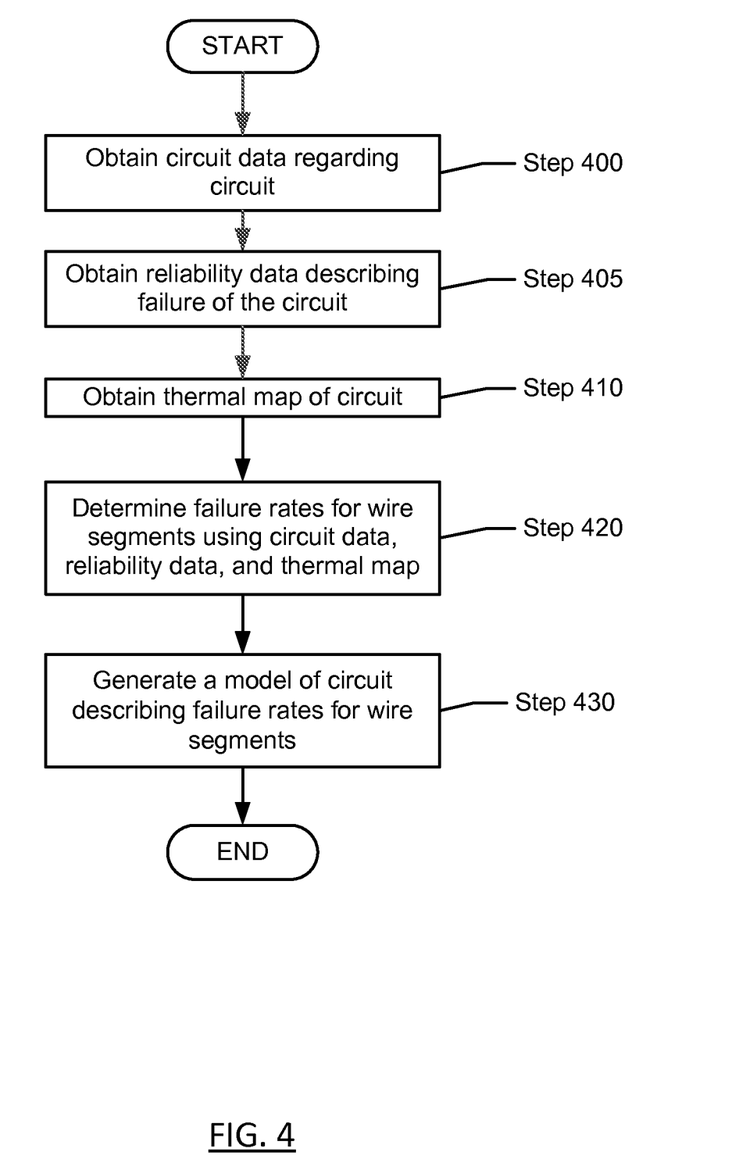
FIGS. 4, 5, and 6 show flowcharts in accordance with one or more embodiments.
Figure 5:
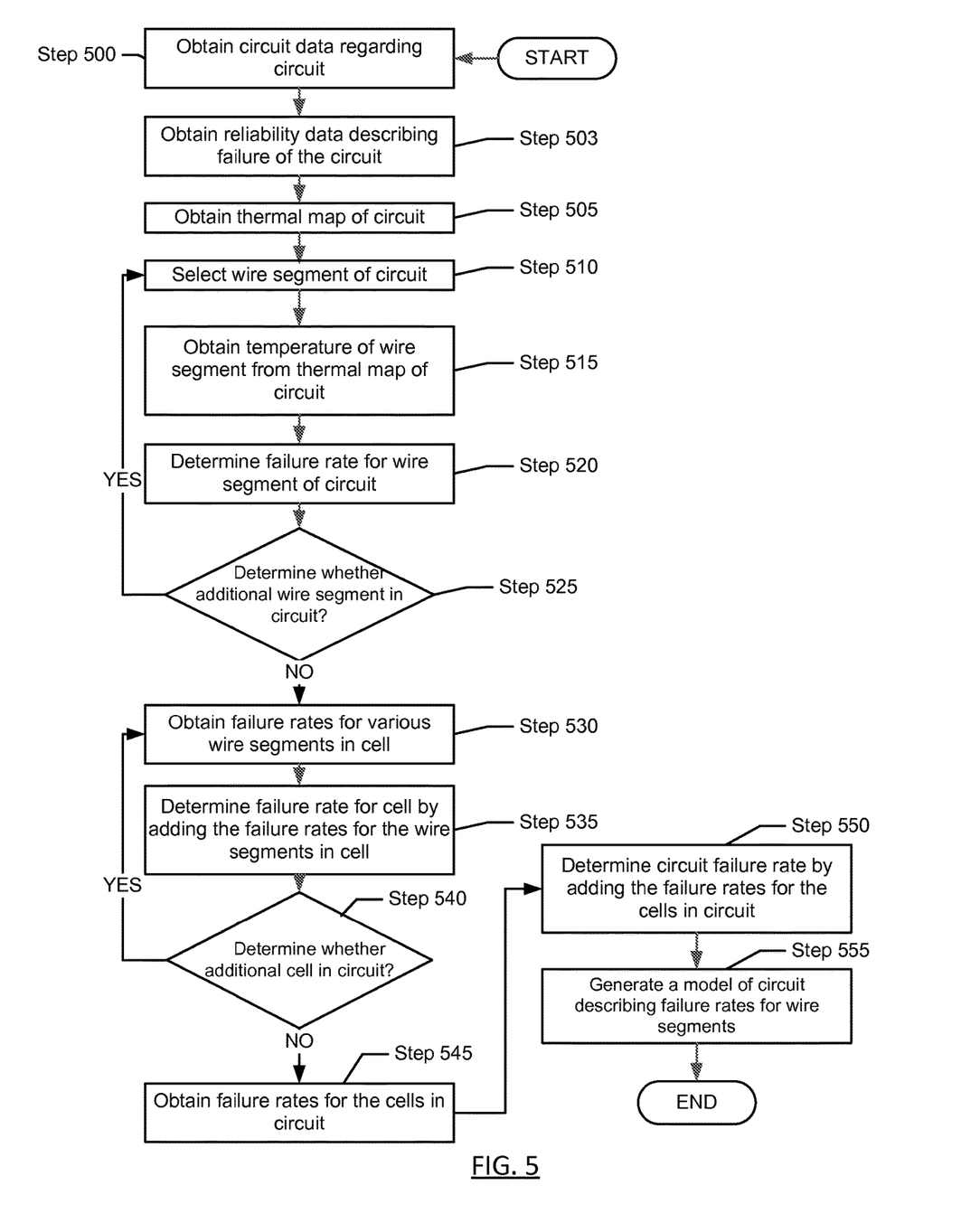
Figure 6:
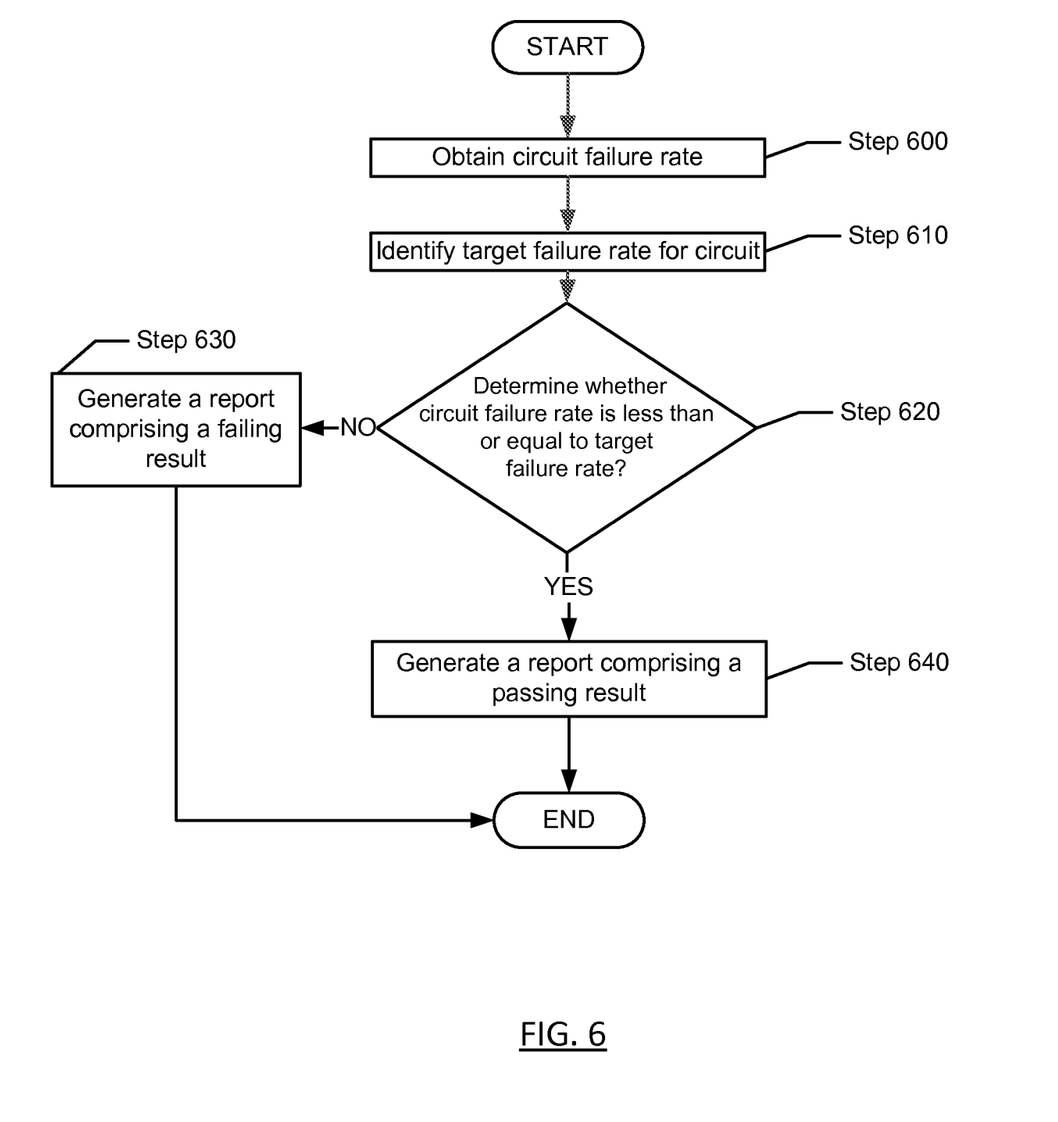

FIGS. 4-6 show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. By way of an example, determination steps may not require a computer processor to process an instruction unless an interrupt is received to signify that condition exists in accordance with one or more embodiments of the invention.

FIG. 4 shows a flowchart describing a method for determining a failure -in-time (FIT) rate for a circuit in accordance with one or more embodiments of the invention. In Step 400, one or more embodiments are directed to obtaining circuit data regarding the circuit. In one or more embodiments, circuit data are extracted and collected from the data repository and/or various servers by a processor of the computing device.

In Step 405, one or more embodiments are directed to obtaining reliability data regarding the circuit. In one or more embodiments the reliability data is extracted and collected from the data repository and/or various servers by a processor of the computing device. In one or more embodiments, reliability data describes the failure of the circuit during a pre-determined time period. In one or more embodiments, the reliability data includes the various parameters used in Equations 1-19 which are provided by the foundry in order to determine the failure rate for each wire segment.

In one or more embodiments, the reliability data is obtained by reliability testing of circuits of circuit components, including testing circuits under conditions of varying voltages, currents, current densities, humidity, pressure, vibration, and/or temperatures.

Further, circuit data may be obtained from the circuit under these conditions, such as current density, resistance, voltage, and/or temperature of circuit components. For example, a test product may be considered to fail if the resistance of a wire segment increases beyond a pre-determined threshold value, where the pre-determined threshold value may correspond to an open circuit due to a void within the wire segment. Therefore, failure rates of components sampled from a population of circuit components may be obtained from reliability testing.

Further, the processor of the computing device may aggregate the failure rates procured from reliability testing into a random variable time to failure (TTF). Here, the processor may generate the CDF, or the failure function F(t), of the random variable TTF, as described by Equation 1. Using the CDF, the processor may determine the reliability function, R(t), as described by Equation 2. Furthermore, the processor may determine the derivative of the CDF with respect to time t to produce the PDF of the random variable TTF, as described by Equation 3.

In Step 410, one or more embodiments are directed to obtaining a thermal map of the circuit. In one or more embodiments, thermal maps are extracted and collected from the data repository and/or various servers by a processor of the computing device. In particular, the failure rates for components of a circuit exhibit an exponential correlation with the temperatures of the corresponding components, as described above regarding Equation 10. For example, a change of 7 degrees Celsius may result in approximately two orders of magnitude change in failure rate.

In Step 420, one or more embodiments are directed to determining the failure rate for one or more wire segments of the circuit. The failure rates may be determined by using the circuit data and reliability data obtained in Step 400, and the thermal map obtained in Step 410. For example, using F(t) and R(t), the processor may determine the failure rate of the wire segment, $\lambda(t)$, by dividing the PDF by R(t), as described by Equation 5.

In one or more embodiments, the processor determines the average failure rate (AFR) by integrating the failure rate $\lambda(t)$ over an interval of time t, where the interval of time is from time zero to time t, and dividing the resulting value by time t, as described by Equation 6. In one or more embodiments, the processor of the computing device determines the mean ($T_{50}$) of the random variable TTF as the failure rate of the wire segment. Here, the processor may use the temperature of a selected wire segment obtained from the thermal map, the current density of the selected wire segment, in addition to Black's coefficient (A), activation energy ($E_a$), the Boltzmann's coefficient ($k_B$), and a process parameter (n) obtained from the circuit data, to determine the mean ($T_{50}$) of the random variable TTF, as described by Equation 10.

In one or more embodiments, circuit failure rate analysis includes the classification of the circuit into discrete hierarchies. For example, the wire segments of a circuit may be designated the fundamental or base level of the circuit. Next, a cell of the circuit, which may include wire segments within a particular section of the circuit, may be designated the next ordered level in the hierarchies of the circuit. Further, a cluster of the circuit, which may include various cells within a particular section of the circuit, may be designated the next ordered level in the hierarchies of the circuit. Finally, the overall circuit itself may be designated the apex of the hierarchies of the circuit, and may include all of the various clusters of the circuit. Those skilled in the art will appreciate that other embodiments may be devised that divide the circuit into greater or fewer discrete hierarchies.

In one or more embodiments, failure rates are determined for each level in the hierarchies of the circuit. Initially, the failure rates for each wire segment of the circuit, which may be designated the base level of the circuit, may be determined. Next, the failure rates of the base level are then propagated up the hierarchy in order to determine the failure rate for each cell of the circuit. For example, as described by Equation 9, the failure rates of various wire segments within a particular cell are added together in order to determine the failure rate of that particular cell. Further, the failure rates at the cell level are propagated up the hierarchy in order to determine the failure rate for each cluster of the circuit. For example, as described by Equation 9, the failure rates of various cells within a particular cluster are added together in order to determine the failure rate of that particular cluster. Finally, the failure rates at the cluster level are then propagated up the hierarchy in order to determine the circuit failure rate. For example, as described by Equation 9, the failure rates of clusters within the circuit are added together in order to determine the circuit failure rate. Additionally, in one or more embodiments, target failure rates may be designated for each individual level of the circuit. Therefore, this hierarchical method of failure rate analysis allows for the determination of how each level of the circuit contributes to the overall circuit failure rate. For example, any particular cells and/or clusters that have disproportionately high failure rates may be targeted in order to mitigate circuit failure rates that exceed target failure rates.

The EM analysis described herein may allow for dynamic budgeting of failure rates for various components of the circuit. This EM analysis may be used for any circuit and/or IC, and may incorporate any EM reliability and/or acceleration model. In one or more embodiments, the EM analysis uses Black's Equation (Equation 10) as an acceleration model during reliability testing In one or more embodiments, the EM analysis uses any acceleration model during reliability testing that allows for the determination of failure rates for circuit components. Further, the dynamic failure rate budgeting recognizes that not all wires segments require the same target failure rate. If total circuit failure rate of the IC is greater than the target failure rate, the target failure rate for each wire segment, cell, and/or cluster may be dynamically altered, depending on the calculated failure rate for each portion of the circuit.

In one or more embodiments, use of the thermal map with circuit failure rates allow for identification of circuit components which disproportionately contribute to the overall circuit failure rate. For example, a particular cluster within a circuit may exhibit higher temperatures than other clusters for prolonged periods of time during operation. Failure rate of a component is highly dependent on the temperature of that particular component, as described above regarding Equation 10. Consequently, these specific areas of the circuit may require modifications in order to decrease their temperature, which would simultaneously decrease their respective failure rate. For example, a cluster which exhibits high temperatures may be modified by widening the wire segments of the cluster in order to meet target failure rates for the circuit. Additionally, the active times of the cluster during operation of the circuit may be decreased in order to decrease temperatures of the cluster. In this way, the thermal map may be used for circuit failure rate analysis.

In Step 430, one or more embodiments are directed to generating a model of the circuit that describes the failure rates for components of the circuit. In one or more embodiments, the circuit model generator uses a processor of the computing device to produce a model of the circuit illustrating the failure rates of circuit components.

In one or more embodiments, the circuit model generator runs a computer simulation of the circuit to produce a circuit model that replicates the operation of the circuit. Further, the circuit model generator may use circuit data, such as values of current density, voltage, resistance, inductance, and/or capacitance, circuit component temperature values, as well as circuit component failure rate values as inputs within a computer simulation software to synthesize an output that models the operation of a circuit. For example, the circuit model may be an image of the circuit that may be generated by the circuit model generator illustrating the circuit, the wire segments of the circuit, and the failure rate for each wire segment of the circuit, as well as the overall circuit failure rate. Accordingly, the circuit model may be used as a visual representation of the circuit and the accompanying failure rates for components of the circuit. In one or more embodiments, the circuit model may include further information and/or data regarding the circuit. In one or more embodiments, the circuit model generator produces a thermal map of the circuit. For example, the circuit model may include a thermal map for the circuit and/or temperatures for components of the circuit. In one or more embodiments, the circuit model and thermal map are presented on a user device. For example, the circuit model and thermal map may be presented by a graphical user interface of the user device.

FIG. 5 shows a flowchart describing a method for determining a failure -in-time (FIT) rate for a circuit in accordance with one or more embodiments of the invention. In Step 500, one or more embodiments are directed to obtaining circuit data regarding the circuit. In one or more embodiments, circuit data are extracted and collected from the data repository and/or various servers by the computing device. Specifically, the circuit data may include various data regarding the circuit that may be used when determining the failure rate for the circuit. Additionally, the reliability data may include various parameters which are used above in Equations 1-19 in order to determine the failure rate for each wire segment.

In Step 503, one or more embodiments are directed to obtaining reliability data regarding the circuit. In one or more embodiments, reliability data describes the failure of the circuit during a pre-determined time period. In one or more embodiments, the reliability data is obtained and/or determined as described in Step 405. In one or more embodiments the reliability data is extracted and collected from the data repository and/or various servers by a processor of the computing device.

In Step 505, one or more embodiments are directed to obtaining a thermal map of the circuit. In one or more embodiments, the thermal map is extracted and collected from the data repository and/or various servers by a processor of the computing device. Specifically, the thermal map may include temperature data regarding various components of the circuit.

In Step 510, one or more embodiments are directed to selecting a specific wire segment of the circuit. For example, circuit wire segments are iteratively selected by a processor of the computing device, and subsequently, the failure rate is determined for the selected wire segment in the ensuing steps.

In Step 515, one or more embodiments are directed to obtaining corresponding temperature of the selected wire segment from the thermal map of the circuit. For example, a processor of the computing device may assign a label to each wire segment of the circuit. Next, the processor may iteratively select each labeled wire segment and obtain the corresponding temperature of the selected wire segment from the thermal map stored in the data repository and/or various servers. Further, each wire segment temperature may be stored with the corresponding label of the wire segment within a matrix, and the matrix may be stored in a data repository.

In Step 520, one or more embodiments are directed to determining the failure rate for the selected wire segment of the circuit. The failure rate is determined by a processor of the computing device by using the circuit data and reliability data obtained in Step 500 and the thermal map obtained in Step 505. For example, the failure rate for the selected wire segment may be determined as described in Step 420.

In Step 525, a determination is made by a processor of the computing device whether additional wire segments remain in the circuit in accordance with one or more embodiments. For example, the processor determines whether additional wire segments remain in the circuit for failure rate analysis by the failure rate generator. If no additional wire segment is detected for failure rate analysis, then the process proceeds to Step 530. If an additional wire segment is detected for failure rate analysis, then the process proceeds to Step 510 to iteratively select the next wire segment in the circuit.

In Step 530, one or more embodiments are directed to obtaining failure rates for wire segments within a cell of the circuit. Specifically, a processor of the computing device obtains the failure rates for the wire segments determined in Step 520 by extracting the failure rates for the wire segments from the data repository and/or various servers. For example, the failure rates for the specific wire segments within a particular cell of the circuit are extracted and obtained by the computing device.

In Step 535, one or more embodiments are directed to determining the failure rate for a cell of the circuit. Specifically, the failure rate for the cell is determined by a processor of the computing device by using the failure rates for the wire segments determined in Step 520. For example, the failure rate generator of the computing device may iteratively extract the failure rates of the specific wire segments within a particular cell from a data repository. Subsequently, the processor may add the failure rates of the wire segments together to obtain an aggregated failure rate of the wire segments within the particular cell, as described by Equation 9. Here, the aggregated failure rates of the wire segments within the cell may be the failure rate of the cell.

In Step 540, a determination is made by a processor of the computing device whether additional cells remain in the circuit in accordance with one or more embodiments. For example, the processor determines whether additional cells remain in the circuit for failure rate analysis by the failure rate generator. If no additional cell is detected for failure rate analysis, then the process proceeds to Step 545. If an additional cell is detected for failure rate analysis, then the process proceeds to Step 530 to iteratively select the next cell in the circuit.

In Step 545, one or more embodiments are directed to obtaining failure rates for cells of the circuit. Specifically, a processor of the computing device obtains the failure rates for the cells determined in Step 535. For example, the failure rates for all cells of the circuit determined by the failure rate generator are obtained by the computing device.

In Step 550, one or more embodiments are directed to determining the circuit failure rate. Specifically, the circuit failure rate is determined by a processor of the computing device by using the failure rates for the cells determined in Step 535. For example, the failure rate generator of the computing device may iteratively extract the failure rates of the specific cells within the circuit from a data repository. Subsequently, the processor may add the failure rates of the cells together to obtain an aggregated failure rate of the cells within the circuit, as described by Equation 9. Here, the aggregated failure rates of the cells within the circuit may be the circuit failure rate.

In Step 555, one or more embodiments are directed to generating a model of the circuit a processor of the computing device that describes the failure rates for the various components of the circuit. For example, the circuit model may be an image of the circuit that may be generated by the circuit model generator of the computing device describing the failure rate and temperature for each wire segment of the circuit, each cell of the circuit, as well as the overall circuit. In one or more embodiments, the circuit model is generated as described in Step 430.

FIG. 6 shows a flowchart describing a method for generating a report which describes failure-in-time (FIT) rates for a circuit in accordance with one or more embodiments of the invention. In Step 600, one or more embodiments are directed to obtaining a circuit failure rate. For example, a processor of the computing device may obtain the circuit failure rate generated by the failure rate generator in Step 550 of FIG. 5.

In Step 610, one or more embodiments are directed to identifying a target failure rate for the circuit. Specifically, a processor of the computing device may identify the target failure rate that is stored within the target failure rate data of the data repository. Additionally, the target failure rate may be any value set by a user or set automatically by the processor of the computing device.

In Step 620, a comparison is made by a processor of the computing device regarding the circuit failure rate and the target failure rate for the circuit. For example, the processor determines whether the circuit failure rate obtained in Step 600 is less than or equal to the target failure rate obtained in Step 610. If the circuit failure rate is less than or equal to the target failure rate, then the process proceeds to Step 640. If the circuit failure rate is greater than the target failure rate, then the process proceeds to Step 630.

In Step 630, one or more embodiments are directed to generating a report regarding the circuit. Specifically, the report generator uses a processor of the computing device to produce a report regarding the circuit, which may include a model of the circuit describing the failure rates for the various components of the circuit, as well as the circuit test results determined in Step 620. For example, the report may include a model of the circuit that describes the temperature and failure rate for each wire segment of the circuit, each cell of the circuit, as well as the overall circuit. Additionally, if the processor of the computing device determines that the circuit failure rate is greater than the target failure rate, then the report may include a failing result for the circuit.

In Step 640, one or more embodiments are directed to generating a report regarding the circuit by a processor of the computing device. Specifically, the report generator uses a processor of the computing device to generate a report regarding the circuit, which may include a model of the circuit describing the failure rates for the various components of the circuit, as well as the circuit test results determined in Step 620. If the processor of the computing device determines that the circuit failure rate is less than or equal to the target failure rate, then the report may include a passing result for the circuit.

Figure 7:
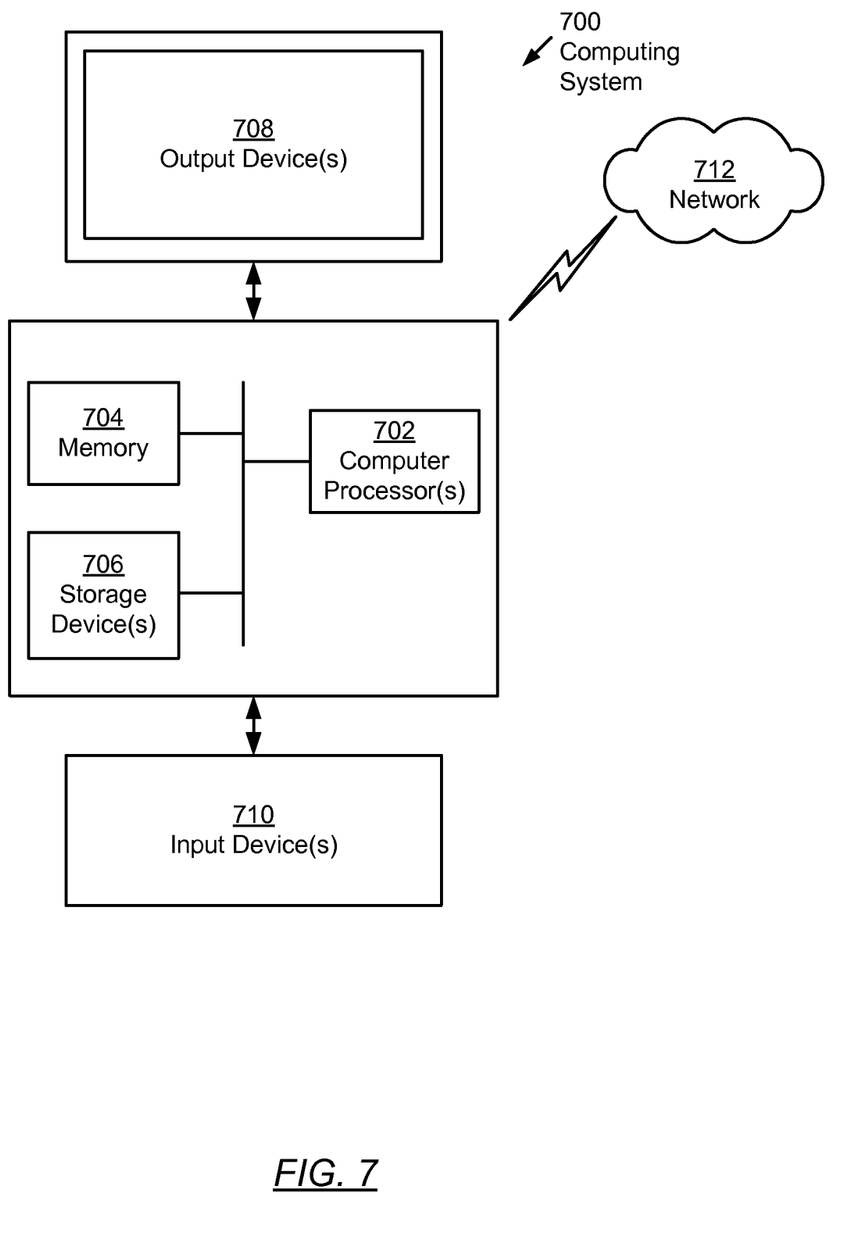
FIG. 7 shows a computing system in accordance with one or more embodiments.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (712). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining failure in time (FIT) rate, comprising:
obtaining circuit data regarding a circuit comprising a plurality of cells each comprising a plurality of wire segments;
obtaining reliability data describing a failure of the circuit over a pre-determined time period;
obtaining a thermal map describing a plurality of temperatures of the circuit;
determining, using the circuit data, the reliability data, and the thermal map, a plurality of failure rates corresponding to the plurality of wire segments of each of the plurality of cells of the circuit, wherein each of the plurality of failure rates is a probability that the corresponding wire segment fails in a predetermined amount of time;
determining a circuit failure rate by adding the plurality of the failure rates corresponding to the plurality of wire segments of each of the plurality of cells of the circuit;
identifying, using the thermal map and the plurality of failure rates corresponding to the plurality of wire segments of each of the plurality of cells, a cell of the plurality of cells that disproportionately contributes to the circuit failure rate; and
generating a model of the circuit that describes the plurality of failure rates corresponding to the plurality of wire segments of each of the plurality of cells of the circuit.

2. The method of claim 1, further comprising:
obtaining a target failure rate for the circuit.

3. The method of claim 2, further comprising:
determining that the circuit failure rate is less than the target failure rate;
generating, in response to determining that the circuit failure rate is less than the target failure rate, a report comprising the model of the circuit and a passing result for the circuit, wherein the passing result describes that the circuit failure rate is less than the target failure rate.

4. The method of claim 2, further comprising:
determining that the circuit failure rate is greater than the target failure rate; and
generating, in response to determining that the circuit failure rate is greater than the target failure rate, a report comprising the model of the circuit and a failing result for the circuit, wherein the failing result describes that the circuit failure rate is greater than the target failure rate.

5. The method of claim 1, wherein the circuit data comprises a plurality of current densities corresponding to the plurality of wire segments of each of the plurality of cells of the circuit.

6. The method of claim 1, wherein the plurality of temperatures comprises a temperature for each of the plurality of wire segments of the circuit.

7. The method of claim 1, wherein the circuit fails upon failure of a single wire segment of the circuit.

8. A system for determining failure in time (FIT) rate, comprising:
a computer processor; and
a memory comprising instructions that, when executed by the computer processor, cause the processor to:
obtain circuit data regarding a circuit comprising a plurality of cells each comprising a plurality of wire segments;
obtain reliability data describing a failure of the circuit during a pre-determined time period;
obtain a thermal map describing a plurality of temperatures of the circuit;
determine, using the circuit data, the reliability data, and the thermal map, a plurality of failure rates corresponding to the plurality of wire segments of each of the plurality of cells of the circuit, wherein each of the plurality of failure rates is a probability that the corresponding wire segment fails in a pre-determined amount of time;
determine a circuit failure rate by adding the plurality of the failure rates corresponding to the plurality of wire segments of each of the plurality of cells of the circuit;
identify, using the thermal map and the plurality of failure rates corresponding to the plurality of wire segments of each of the plurality of cells, a cell of the plurality of cells that disproportionately contributes to the circuit failure rate; and generate a model of the circuit that describes the plurality of failure rates corresponding to the plurality of wire segments of each of the plurality of cells of the circuit.

9. The system of claim 8, wherein the memory further comprises instructions that, when executed by the computer processor, cause the processor to:

obtain a target failure rate for the circuit.

10. The system of claim 9, wherein the memory further comprises instructions that, when executed by the computer processor, cause the processor to:

determine that the circuit failure rate is less than the target failure rate; and generate, in response to determining that the circuit failure rate is less than the target failure rate, a report comprising the model of the circuit and a passing result for the circuit, wherein the passing result describes that the circuit failure rate is less than the target failure rate.

11. The system of claim 9, wherein the memory further comprises instructions that, when executed by the computer processor, cause the processor to:

determine that the circuit failure rate is greater than the target failure rate; and generate, in response to determining that the circuit failure rate is greater than the target failure rate, a report comprising the model of the circuit and a failing result for the circuit, wherein the failing result describes that the circuit failure rate is greater than the target failure rate.

12. The system of claim 8, wherein the circuit data comprises a plurality of current densities corresponding to the plurality of wire segments of each of the plurality of cells of the circuit.

13. The system of claim 9, wherein the plurality of temperatures comprises a temperature for each of the plurality of wire segments of the circuit.

14. The system of claim 8, wherein the circuit fails upon failure of a single wire segment of the circuit.

15. A non-transitory computer readable medium comprising instructions that, when executed by a computer processor, cause the computer processor to:

obtain circuit data regarding a circuit comprising a plurality of cells each comprising a plurality of wire segments;

obtain reliability data describing a failure of the circuit during a pre-determined time period;

obtain a thermal map describing a plurality of temperatures of the circuit;

determine, using the circuit data, the reliability data, and the thermal map, a plurality of failure rates corresponding to the plurality of wire segments of each of the plurality of cells of the circuit, wherein each of the plurality of failure rates is a probability that the corresponding wire segment fails in a predetermined amount of time;

determine a circuit failure rate by adding the plurality of the failure rates corresponding to the plurality of wire segments of each of the plurality of cells of the circuit;

identify, using the thermal map and the plurality of failure rates corresponding to the plurality of wire segments of each of the plurality of cells, a cell of the plurality of cells that disproportionately contributes to the circuit failure rate; and generate a model of the circuit that describes the plurality of failure rates corresponding to the plurality of wire segments of each of the plurality of cells of the circuit.

16. The non-transitory computer readable medium of claim 15, wherein the instructions, when executed by the computer processor, further cause the processor to:

obtain a target failure rate for the circuit.

17. The non-transitory computer readable medium of claim 16, wherein the instructions, when executed by the computer processor, further cause the processor to:

determine that the circuit failure rate is less than the target failure rate;

generate, in response to determining that the circuit failure rate is less than the target failure rate, a report comprising the model of the circuit and a passing result for the circuit, wherein the passing result describes that the circuit failure rate is less than the target failure rate.

* * * * *